(12) United States Patent
Anonsen (10) Patent No.: US 7,711,675 B2
(45) Date of Patent: May 4, 2010

(54) DATABASE SIMULATION OF DATA TYPES

(75) Inventor: Steven P. Anonsen, Fargo, ND (US)

(73) Assignee: Microsoft Corporation, Redmond, WA (US)

(*) Notice: Subject to any disclaimer, the term of this patent is extended or adjusted under 35 U.S.C. 154(b) by 685 days.

(21) Appl. No.: 10/200,602

(22) Filed: Jul. 22, 2002

(65) Prior Publication Data
US 2004/0015474 A1 Jan. 22, 2004

(51) Int. Cl.
*G06F 17/00* (2006.01)
*G06F 17/30* (2006.01)
*G06F 15/16* (2006.01)
*G06F 9/45* (2006.01)

(52) U.S. Cl. .............. 707/1; 707/10; 707/100; 707/103 R; 709/203; 717/137

(58) Field of Classification Search .............. 707/1–10, 707/100–104.1, 200–201; 709/203, 217–231; 717/137, 141
See application file for complete search history.

(56) References Cited

U.S. PATENT DOCUMENTS

| 5,694,598 | A | * | 12/1997 | Durand et al. .......... 707/103 R |
| 5,797,137 | A | * | 8/1998 | Golshani et al. ............... 707/4 |
| 5,873,093 | A | * | 2/1999 | Williamson et al. ..... 707/103 R |
| 5,878,411 | A | * | 3/1999 | Burroughs et al. .............. 707/4 |
| 5,937,402 | A | * | 8/1999 | Pandit ............................ 707/4 |
| 6,016,497 | A | * | 1/2000 | Suver ......................... 707/103 |
| 6,101,502 | A | * | 8/2000 | Heubner et al. ......... 707/103 R |
| 6,122,641 | A | * | 9/2000 | Williamson .................. 707/103 |
| 6,163,781 | A | * | 12/2000 | Wess, Jr. .................. 707/103 X |
| 6,385,618 | B1 | * | 5/2002 | Ng et al. ................... 707/103 Y |
| 6,484,180 | B1 | * | 11/2002 | Lyons et al. ............. 707/103 R |
| 6,529,909 | B1 | * | 3/2003 | Bowman-Amuah .......... 707/10 |
| 6,601,058 | B2 | * | 7/2003 | Forster et al. ................... 707/3 |
| 6,604,104 | B1 | * | 8/2003 | Smith .......................... 707/10 |
| 6,609,133 | B2 | * | 8/2003 | Ng et al. ................... 707/103 Y |
| 6,640,231 | B1 | * | 10/2003 | Andersen et al. ............. 707/102 |
| 6,643,652 | B2 | * | 11/2003 | Helgeson et al. .............. 707/10 |
| 6,704,747 | B1 | * | 3/2004 | Fong ....................... 707/104.1 |
| 6,920,444 | B2 | * | 7/2005 | Lee ............................... 707/1 |
| 6,941,295 | B2 | * | 9/2005 | Nakamura et al. ............. 707/3 |
| 6,957,214 | B2 | * | 10/2005 | Silberberg et al. ............. 707/4 |
| 6,999,956 | B2 | * | 2/2006 | Mullins ......................... 707/2 |
| 7,020,660 | B2 | * | 3/2006 | Woodring ............... 707/103 R |
| 7,028,028 | B1 | * | 4/2006 | Balmin et al. .................. 707/4 |
| 7,031,976 | B1 | * | 4/2006 | Ibitayo et al. ........... 707/103 R |
| 7,103,590 | B1 | * | 9/2006 | Murthy et al. .................. 707/3 |
| 7,152,070 | B1 | * | 12/2006 | Musick et al. .............. 707/101 |

(Continued)

OTHER PUBLICATIONS

Chamberlin, D.; A Complete Guide to DB2 Universal Database), 1998, pp. 271-386.

*Primary Examiner*—Miranda Le
(74) *Attorney, Agent, or Firm*—Westman, Champlin & Kelly, P.A.

(57) ABSTRACT

The present invention is a method for comparing object data in an object domain with database data in a database domain. The method includes applying a first transfer function to the object data so as to generate a first transformed data. The method also includes applying a second transfer function to the database data so as to generate a second transformed data. Finally, the method includes comparing the first transformed data with the second transformed data.

20 Claims, 3 Drawing Sheets

U.S. PATENT DOCUMENTS

| | | | |
|---|---|---|---|
| 2001/0047372 A1* | 11/2001 | Gorelik et al. | 707/514 |
| 2002/0010773 A1* | 1/2002 | Meleis | 709/223 |
| 2002/0046201 A1* | 4/2002 | Hembry | 707/1 |
| 2002/0078008 A1* | 6/2002 | Cambot et al. | 707/1 |
| 2002/0087516 A1* | 7/2002 | Cras et al. | 707/2 |
| 2002/0091702 A1* | 7/2002 | Mullins | 707/100 |
| 2002/0194155 A1* | 12/2002 | Aldridge et al. | 707/1 |
| 2003/0004979 A1* | 1/2003 | Woodring | 707/203 |
| 2003/0028545 A1* | 2/2003 | Wang et al. | 707/100 |
| 2003/0033277 A1* | 2/2003 | Bahulkar et al. | 707/1 |

* cited by examiner

DATABASE SIMULATION OF DATA TYPES

BACKGROUND OF THE INVENTION

The present invention relates to database systems. More specifically, the present invention relates to methods for simulating data types within a database system.

In conventional relational databases, all data are stored in named tables. The tables are described by their features. In other words, the rows of each table contain items of identical type, and the definitions of the columns of the table (i.e., the column names and the data types stored in the column) describe the attributes of each of the instances of the object. By identifying its name, its column names and the data types of the column contents, a table is completely described. Queries to a relational database are formulated in a query language. One such language is SQL (Structure Query Language) which is widely used in commercial relational data base systems. The data types offered by SQL can be classified as character arrays (names), numbers, and data types related to date and time.

Another recent technology for database systems is referred to as object oriented database systems. These systems offer more complex data types than those associated with conventional relational databases. In the context of object oriented data base models, an "object" includes both data and the functions (or methods) which can be applied to the object. Each object is a concrete instance of an object class defining the attributes and methods of all its instances. Each instance has its unique identifier by which it can be referred to in the database.

Yet another recent technology for database systems is referred to as object-relational (O-R) database systems. Generally speaking, object-relational database systems attempt to combine the advantages of the wide acceptance of relational databases and the benefits of the object oriented paradigm. There are generally two variants of O-R systems: one adds the capabilities to the database management system itself; the other is external to the database and addresses the "impedance mismatch" between objects and relational tables. Unless and until objects run in the database, such systems will be necessary. Some of these databases employ a data model that attempts to add object oriented characteristics to tables. All persistent (database) information is still in tables, but some of the tabular entries can have richer data structure.

The typical object-relational database is still relational because data is stored in tables of rows and columns, and SQL, with some extensions, is typically the language for data definition, manipulation, and query. As opposed to a strictly relational database system, however, an object-relational database system allows queries and commands to be made through an object oriented interface.

Certain object oriented languages for database management are known to include an ability to expand a data type system to include new and/or specialized data types. However, certain relational database languages, including many versions of SQL, do not accommodate creation of these new and/or specialized data types. In the context of object-relational database systems, it is not uncommon that queries expressed against objects are not allowed to reference custom data types. This is typically because the custom data types referenced in the context of the object system are not properly associated with any data types stored within the corresponding relational database system. This outcome is undesirable because, in some instances, the format of a data type utilized by the relational portion of the object-relational system is functionally inconvenient as compared to an alternate format that is supported by the object portion of the system. In other instances, the format of a data type utilized by the relational portion is structured to not meet a system operator's format expectations. In many cases, the object portion of an object-relational system is capable of supporting data types having a more effective or intuitive format than the data types supported by corresponding relational databases.

SUMMARY OF THE INVENTION

The present invention generally relates to methods for simulating data types within a database system.

One embodiment of the present invention is a method of comparing object data in an object domain with database data in a database domain. The method includes applying a first transfer function to the object data so as to generate a first transformed data. The method also includes applying a second transfer function to the database data so as to generate a second transformed data. Finally, the method includes comparing the first transformed data with the second transformed data.

Other features and benefits that characterize embodiments of the present invention will be apparent upon a reading of the following detailed description and review of the associated drawings.

DETAILED DESCRIPTION OF ILLUSTRATIVE EMBODIMENTS

Figure 1:
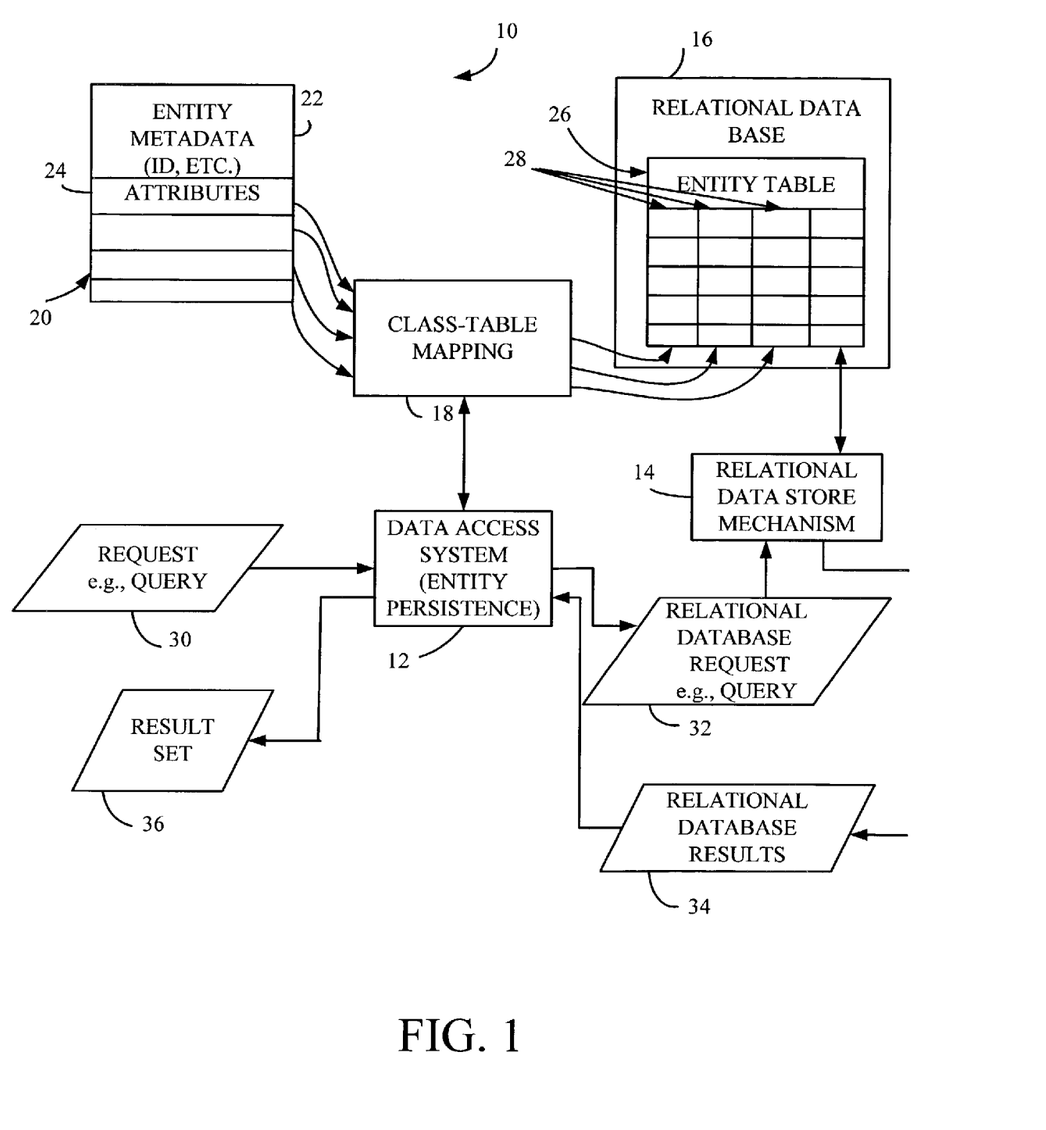
FIG. 1 is a block diagram of one embodiment of an object-relational data storage system.

FIG. 1 is a block diagram illustrating one embodiment of a data storage and accessing system 10 in accordance with the present invention. System 10 includes data access system (or entity or object persistence system) 12, relational data store mechanism 14, relational database 16, and class-table mapping 18. System 10 is illustratively an object-relational (O-R) data storage system in which stored data can be referred to in terms of objects and their properties, rather than elements of the data base schema, such as tables and columns. FIG. 1 illustrates one mechanism for doing this.

As shown in FIG. 1, the data can be organized in terms of objects 20 (which is used interchangeably herein with the term entities). Each object illustratively includes a metadata portion 22 and a remaining attributes portion 24. The metadata portion 22 describes the object 20, while the remaining attributes 24 define further attributes of object 20, such as the data stored therein. Each of the attributes in object 20 is mapped to a corresponding object table 26 and a specific column 28 in a given object table 26.

Data access system 12 can receive various forms of requests such as a query 30 which specifies an object, or portions of an object or group of objects, to be retrieved. Query 30 can illustratively be expressed in terms of objects ("entities") and properties, rather than in terms of tables and columns.

Data access system 12 receives the query 30 and accesses class-table mapping 18. In this way, data access system 12 can determine the location of the data for the objects identified by query 30. Data access system 12 includes a translator that translates query 30 into a relational database query 32 which is suitable for input to relational data store mechanism 14. In one illustrative embodiment, relational data store mechanism 14 is an SQL SERVER database server such as that available from the Microsoft Corporation of Redmond, Wash., that accesses a relational database 16. Therefore, data access system 12 receives queries 30 in terms of objects and translates those queries into an appropriate relational database query 32 that is then provided to the data store mechanism (or server) 14 which actually accesses the data in relational database 16.

Relational data store mechanism 14 retrieves the requested data and returns it in the form of relational database results 34. The results are returned to data access system 12 which then formulates the relational database results 34 into a requested result set 36. In one illustrative embodiment, result set 36 is requested in query 30. Query 30 may request that the results be output in the form of one or more objects or simply as a data set. In any case, data access system 12 arranges the relational database results 34 into the proper format and outputs them as result set 36.

Figure 2:
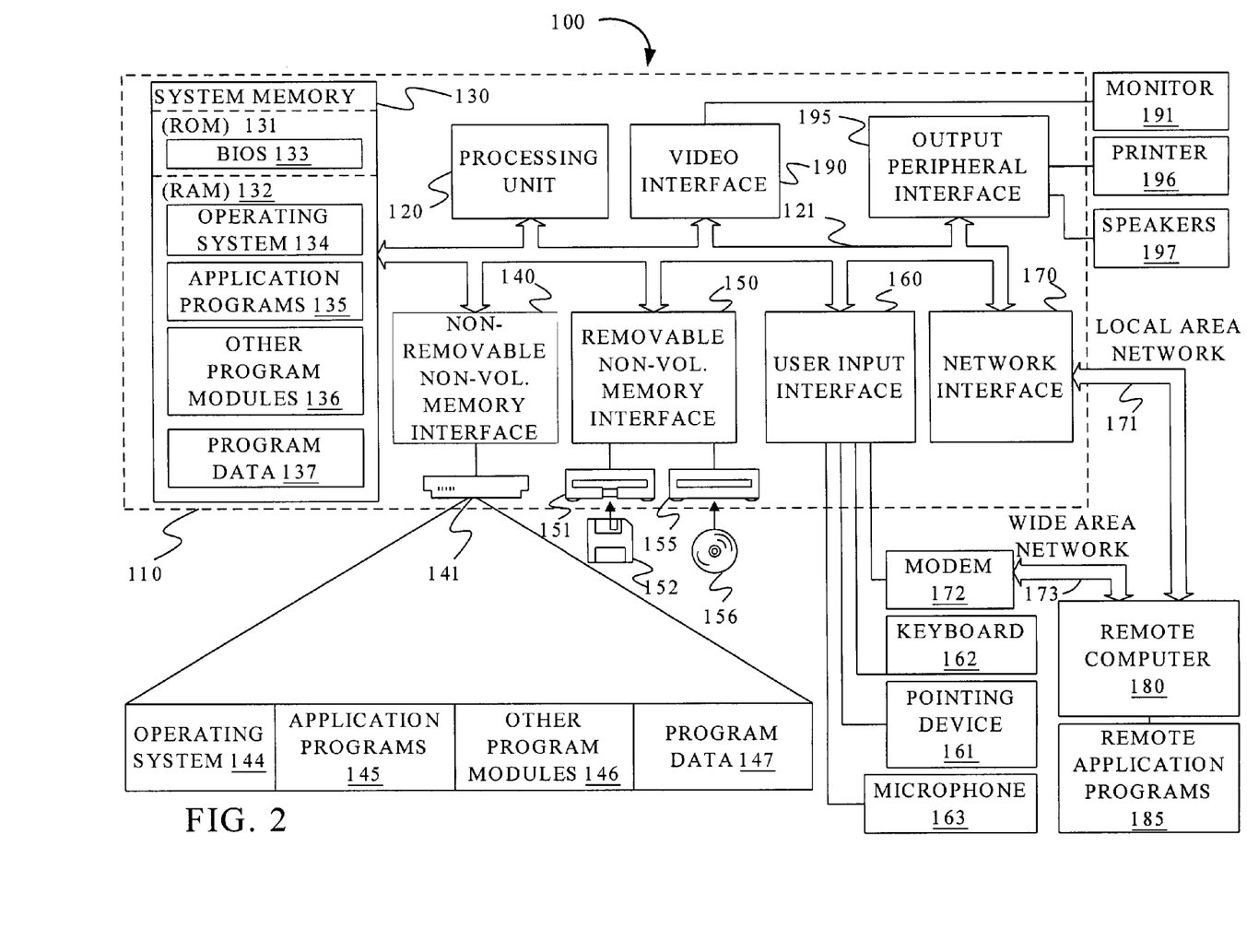
FIG. 2 is a block diagram of an environment in which the present invention can be used.

Data access system 12 hides the physical data store (mechanism 14 and database 16) from the users and developers enabling them to work in terms of objects rather than requiring them to know both the schema of database 16 and the syntax of the particular data store mechanism 14. FIG. 2 shows one embodiment of an environment in which the present invention can be used.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 2. However, the present invention can be carried out on a server, a computer devoted to message handling, or on a distributed system in which different portions of the present invention are carried out on different parts of the distributed computing system.

With further reference to FIG. 1, system 10 is illustratively an object-relational (O-R) data storage system in which data access system 12 receives queries 30 in terms of objects and translates those queries into an appropriate relational database query 32 that is then provided to the data store mechanism (or server) 14 which accesses the data in relational database 16. In accordance with one aspect of the present invention, there are instances when the particular format associated with how a particular type of data is stored within relational database 16 is not of a form that a user or system operator would expect, desire, or, in some instances, understand. In other words, relational database 16 does not support a particular desired data type. For example:

A % value may be stored in database 16 as a scaled integer where 10,000 is 100%, as a decimal where 100 is 100%, or as a ratio where 1 is 100%

Document types are stored in database 16 as integers that have no meaning to users Money stored as the numeric value and its currency; Inventory quantities stored with a particular unit of measurement (e.g., a user or system operator might expect or desire utilization of a different currency or unit of measurement than that incorporated into the database)

In instances such as these, the data type supported by relational database 16 is not identical to what is expected or desired by a client or system user. However, the freedom to create alternative data types to represent database 16 data is limited by constraints associated with the typical relational database and its associated query language (e.g., SQL).

The limitations associated with relational database data types can cause other types of problems for users and system operators. For example, it can sometimes be desirable to store a series of digits divided into several distinct segments. Take for instance the example of a general ledger account number (GL AccountNumber) that reads 200-1000-20. Suppose the intention is that this three-segment series of numbers be treated like one long number (without the dashes), while still retaining an ability to be sorted by any of its three individual segments. Most relational database languages (e.g., SQL) cannot easily be configured to sort sub-fields or segments. Accordingly, in order for the segments to be easily sortable, they can each be stored independently within their own columns in the relational database.

However, when each segment is stored independently, this complicates the ability to treat the entire GL AccountNumber as one continuous numeral. Imagine, for example, that a user queries for all GL AccountNumbers greater than 200-1000-20. If all three segments of each GL AccountNumber are stored consecutively in a single column, then the system user sacrifices the ability to easily sort based on any one of the three segments. If each segment is stored independently within the relational database, it becomes difficult to carry out the requested "greater than" query. The relational database could be queried to return all GL AccountNumbers wherein the first segment is greater than 200, the second segment is greater than 1000, and the third segment is greater than 20. However, such a query would not return 300-0900-10, which when properly interpreted as one continuous digit, is greater than 200-1000-20.

A particularly inefficient way to possibly satisfy the "greater than" query might be to request that all GL AccountNumbers be retrieved from the relational database, where the qualifying GL AccountNumbers could be identified on the client after the transfer has occurred. However, there could be thousands or even millions of columns associated with all GL AccountNumbers. This solution is undesirable because it basically turns the client into a query processor. The database server is a significantly more efficient tool for processing queries.

Figure 3:
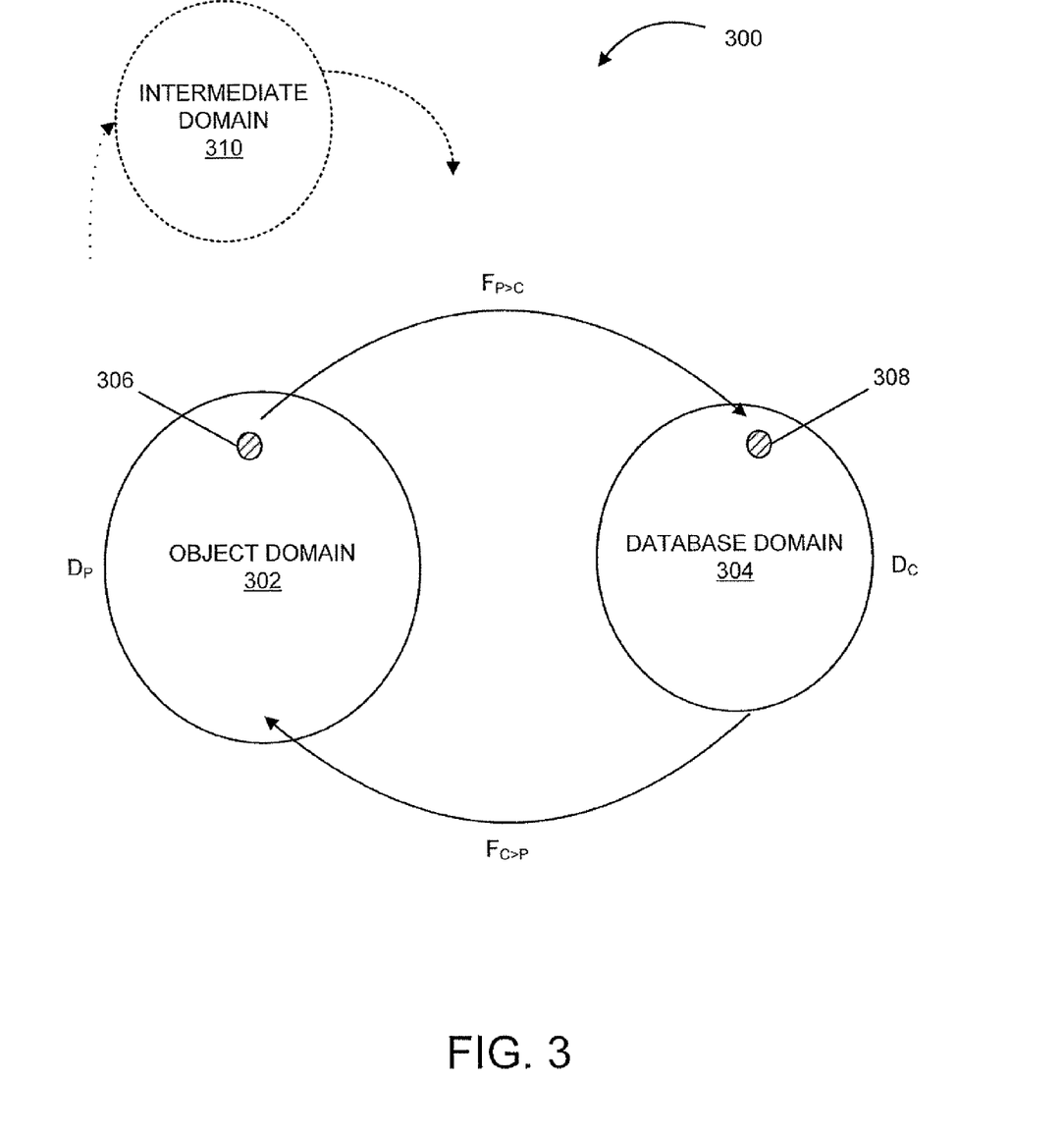
FIG. 3 is a schematic block diagram of a database system.

FIG. 3 is a schematic block diagram of a system 300 that shows functional interactions between different domains. System 300 includes an object domain 302 that illustratively corresponds to an object portion of an object-relational database system. System 300 also includes a database domain 304 that illustratively corresponds to a relational database portion of an object-relational database system. Object domain 302 includes a data component 306 that is illustratively of a first data type. Database domain 304 includes a data component 308 that is illustratively of a second data type, wherein the first data type is different than the second data type. Data component 306 illustratively has the same meaning as data component 308, although the two components are expressed in two different data types. In other words, data components 306 and 308 represent the same value, just expressed differently within the two domains.

A function is illustratively required to transform data component 306 into data component 308. For the purpose of the present description, that function will be referred to as $F_{p>c}$ (e.g., the function transforms a data component from object property format to relational database column format). Data that has been transferred into its property domain format will be referred to as $D_p$. In order to transform data component 308 into data component 306, another function is required. For the purpose of the present description, that function will referred to as $F_{c>p}$. (e.g., the function transforms a data component from relational database column format to object property format). Data that has been transferred into its database domain format will be referred to as $D_c$.

Given the two functions for transferring between data component formats, the issue becomes where to run the function, or what computational device is going to run it. The number of data types associated with object domain 302 illustratively outnumbers the number of data types associated with database domain 304. Further, the data types associated with database domain 304 are illustratively a strict subset of the data types associated with object domain 302. Based on such information, it is not difficult to derive $F_{c>p}$ (e.g., after an evaluation and $D_c$ results have been returned to object domain 302). In fact, the transform functions can actually be given a class or even an object. For example, one could have a function that takes one specific input, such as a number of decimal places, and returns a result that simply subtracts an arbitrary number or performs some arbitrary function upon the input data, such as subtract 1 from the number of decimal places. This would be an example of a transform function, such as $F_{c>p}$ or $F_{p>c}$.

The challenge becomes evaluating (e.g., comparing for purposes of a query) a particular $D_p$ value within an environment that does not understand that particular $D_p$ data type. For example, the challenge lies in evaluating a particular GL AccountNumber within database domain 304, an environment that is not illustratively capable of handling the standard GL AccountNumber format. As another example, the challenge lies in evaluating a particular percent value within database domain 304, an environment that is illustratively only capable of storing scaled integers as percent values.

As will be described below in detail, certain aspects of the present invention pertain to methods for enhancing the data type capabilities of relational databases. In accordance with one embodiment, a relational database is configured to support at least some of the custom data types supported by an object system. In order to achieve this outcome, a transform function is applied such that certain data types contained within a relational database are expressed in a specialized way that enables them to be processed as if they embodied a particular customized format. In accordance with another aspect of the present invention, evaluating a particular $D_p$ value within an environment that does not understand that particular $D_p$ data type is accomplished through a scheme of data simulation.

In order to make any kind of operation or comparison between two values, one being in the object domain and the other being database domain, the two values must be, in some form or another, placed into a common domain. While one possibility could theoretically be translating data and/or expressions from the object domain to the database domain, there is no reliable way, or at least no uncomplicated way, to translate expressions provided in the object domain into the database domain. Accordingly, a third type of domain, illustratively an intermediate domain 310 (FIG. 3), is provided and is intermediate to both the object domain and the database domain. The intermediate domain needs to have certain characteristics with respect to both the object domain and the database domain. One characteristic is that the intermediate domain must be defined for all operators defined for the property data type in the object domain, and the following must hold for all values:

$D1_p<op>D2_p=F_{c>p}(D1_I<op>D2_I)$; and $F_{p>c}(D1_p<op>D2_p)=D1_{I<op>D2I}$

In other words, the effect of using the operator on data in the intermediate domain is the same as if the operator were used on the data type in the object domain and then converted to the intermediate domain. With regard to the above-example of the GL AccountNumber, consider that each segment contains, for example, a maximum of five digits. Thus, GL AccountNumber 200-1000-20 may map to the intermediate domain by left justifying each segment in a string, adding five arbitrary string characters, such as blanks, and trimming each string such that it has a length of five. Thus, each segment from the GL AccountNumber is transformed into a single string in the intermediate domain. For example, GL AccountNumber 200-1000-20 may transform into 200BB1000B200BB (where B's are space indicators). Subsequently, a similar operation can be performed upon the three columns in the relational database that store the segments of the GL AccountNumber data type. Once both data values have been mapped into the intermediate domain, they can be operated upon.

In accordance with one aspect of the present invention, a method is provided that includes first identifying an SQL data type that will represent the values of the data type generated in the intermediate (also referred to herein as simulated) domain in the database. Then, transform functions that convert the property data type to the intermediate data type and back are identified. As expressed above, it is important that operations with respect to the data in the intermediate domain can be executed by a conventional SQL SERVER database server such as that available from the Microsoft Corporation of Redmond, Wash. in order to ensure efficient operation. SQL statements often require comparisons and/or other operations that must be evaluated for each row of data. The following example illustrates both the problem encountered in the art and the manner in which embodiments of the present invention solve that problem. Consider the following.

```
public struct Quantity {
    private int unit;
    private decimal value;
    // constructor and F_{C+>P}
    public Quantity(int unit, decimal qty) {
        this.unit = unit;
        this.value = unit * qty;
    }
    // F_{P>C+}
    static public void FromQuantity (out int unit, out decimal
```

```
qty, Quantity q) {
        unit = q.Unit;
        qty = q.Scalar;
    }
    public int Unit { get { return unit; } }
    public decimal Scalar { get { return value/unit; } }
    public string ToString( ) { return value.ToString( ); }
}
public class OrderLine : BusinessEntity {
    string id;
    Quantity q1, q2, q3;
    public string ID { get { return id; } }
    public Quantity Q1 { get { return q1; } }
    public Quantity Q2 { get { return q2; } }
    public Quantity Q3 { get { return q3; } }
    // . . .
}
```

Next, consider an object OrderLine that is mapped to a table Order_Line_Table which has the following definition:

```
id nchar(30) UNIQUE
u_of_m1 int
qty1 decimal
u_of_m2 int
qty2 decimal
u_of_m3 int
qty3 decimal
```

The mapping between the OrderLine object and the Order_Line_Table is as follows:

| | |
|---|---|
| OrderLine.ID | ← → id |
| OrderLine.Q1 | FromQuantity → qty1, u_of_m1 |
| OrderLine.Q1 | ← Quantity (qty1, u_of_m1) |
| OrderLine.Q2 | FromQuantity → qty2, u_of_m2 |
| OrderLine.Q2 | ← Quantity (qty2, u_of_m2) |
| OrderLine.Q3 | FromQuantity → qty3, u_of_m3 |
| OrderLine.Q3 | ← Quantity (qty3, u_of_m3) |

The lines with "FromQuantity" mean that the FromQuantity method is being called. The lines with "Quantity" mean that the Quantity constructor is being called. Given the following pseudo query:

```
SELECT OrderLine WHERE (OrderLine.Q1 *
OrderLine.Q2/OrderLine.Q3>1) ORDER BY
OrderLine.Q3.
```

The correction translation of this into an SQL statement is:

```
SELECT id, u_of_m1, qty1, u_of_m2, qty2,
u_of_m3, qty3
FROM Order_Line_Table
WHERE(u_of_m1*qty1)*(u_of_m2*qty2)/(u_of_m3*qty)
>1
ORDER BY (u_of_m3*qty3).
```

More generally, some quantity "Q" is replaced in the statement by "(unit_col*qty_col)". One likely way to implement this feature is in the following example function that is placed in the statement as part of the translation from the object expression to the SQL expression:

```
String.Format ("{0}*{1}", UnitColumnName,
QuantityColumnName).
```

The string "{0}*{1}" is termed an SQL property operand expression because it is an SQL expression that replaces property Q anywhere Q is an operand. As the expression implies, the "{0}" and "{1}" are replaced by the column name that is the argument to the function. Note that the expression is the same expression as used in the quantity constructor above.

```
public Quantity(int unit, decimal qty) {
this.unit = unit;
    this.value = unit * qty; // same as the operand expression
}
```

Thus, the above SQL expression converts columns of the quantity type into their property form before the evaluation occurs. From this, we can observe that expressions executed in the SQL server are executed on data in its property form. It must operate on $D_p$ rather than $D_c$. The expression itself is in terms of columns. The SQL expression will operate upon each record in the relational database thereby calling the transform function to make each and every comparison.

A typical SQL server has the capability to allow function calls within SQL statements. This allows a developer to write a function and store it in SQL server as an object in the database, then SQL statements can call that function which can be, for example, of the form foo(columnA,ColumnB). Illustratively, the function shows up in the statement due to translation.

Embodiments of the present invention generally provide three distinct types of data transformations. Specifically, data transformations can change types, translate data, and simulate calculated properties.

A type-changing transformation enables the use of a custom data type that is not directly supported by the database. It takes a custom data type and transforms it to and from a data format compatible with the data types supported by SQL Server. For example, a GL AccountNumber type needs a type-changing transform to convert data to and from the string columns in the database.

Since columns of a custom data type are not supported by the database, their use in an object criteria "where" clause cannot be translated without additional assistance. A custom data type must provide an operand expression that makes the multiple columns of that type act as a unit in the SQL where clause. Type-changing transforms are data type specific so that literals of that data type can be processed correctly.

A data-translating transform takes a property of a type that is compatible with the database and modifies it without changing the type. An example of this transform is where a column contains the values 1, 2 or 3 to indicate 0, 1 or 2 decimal places. For example, if a property wants the decimal places to be zero based, a data translation must occur. One way to interpret the data-translating transform is as a special case of translation where two of the domains are overlapping.

The final transform is a derived property calculation. This supports ad hoc queries against derived properties. It is always read-only. Therefore only $F_{C+>P}$ is required. For example, it could calculate a derived Total property:

```
public decimal Total {
    get { return Subtotal + Tax; }
}
```

All of these transformations involve transform functions in various ways, in accordance with embodiments of the present invention.

Efficiently evaluating a predicate (such as within an SQL where clause) expressed in terms of a property P requires expressing the predicate in terms of column variables so that it can be evaluated in the database. The criteria predicate is translated by replacing "P" with $F_{C>p}(C)$ (which is an expression in terms of column variables that returns a property value). A result is a predicate in terms of the columns. To do this, the producer of $F_{C>p}$ will provide $F_{C>p}$ in SQL. Such a function could either be a named, user defined function such as "MyUserDefFunc({0})", or it could be an unnamed in-line function such as "{0}-1." It is important to note that "{0}-1" is a transform function itself though it is not named. In either case, "{0}" is replaced by the column name that is the argument to the function. For example, given a predicate:
    where P>2;
    P is replaced with its transformed function:
    where $F_{C>p}(C)$>2.
    Assuming that $F_{C>p}$ is ≡"{0}/3" replacing {0} with C we get:
    where (C/3)>2
as the translation of the original where clause which will execute properly inside the SQL server. Note that "C/3" converts a column into a property value, which is then compared against the property literal 2. Thus, an expression must be in terms of column variables but will convert those columns to property values before evaluating the expression.

If a property (P's) type T is not supported by the SQL server, the date type author must find a type T' that has the same operator list and operator semantics as T. Evaluating an expression involving P requires transforming T into an instance of T'. For example, the GL AccountNumber's operator list and operator semantics are the same as those of a string, so if we convert an account number to a string we can get an SQL server to evaluate expressions against an account number correctly. Similarly, the operator list and the operator semantics of a Quantity are the same as those of an integer type. So if we convert Quantity to an integer, SQL server can process it.

Embodiments of the present invention can also be used to perform set operations. Although set operations are slightly more involved, the strategies described above can be used to efficiently convert data into its property form to facilitate such set operations. Consider, an expression in a set operation of the form:

set $P1=P1*P2$.

We must first convert properties P1 and P2 to column expressions. Assuming that $F_{C1>P1}$ transforms P1 to C1 and $F_{C2>P2}$ transforms P2 to C2, we can replace P1 and P2 with their respective functions:

set $P1=F_{C1>P1}(C1)*F_{C2>P2}(C2)$

We still have P1 on the left hand side; since a property value cannot be written to the database (and since P1 is not a known name to the database), we call $F_{P1>C1}$ on each side of the assignment as follows:

set $F_{P1>C1}(P1)=F_{P1>C1}(F_{C1>P1}(C1)*F_{C2>P2}(C2))$.

Those skilled in the art will recognize that the $F_{P1>C1}$ is not applied to C1, but only to the multiplicand of $F_{C1>P1}(C1)$ and $F_{C2>P2}(C2)$.

Evaluating the left hand side, by definition we obtain C1:

set $C1=F_{P1>C1}(F_{C1>P1}(C1)*F_{C2>P2}(C2))$.

Now we replace the functions with their implementations. Assuming that $F_{C1>P1}$≡"{0}*3" and $F_{C2>P2}$≡"{0}-2" the expression becomes:

set $C1=F_{P1>C1}((C1*3)*(C2-2))$.

Finally, assuming $F_{P1>C1}$≡"{0}/3" (the inverse of $F_{C1>P1}$), we can replace and obtain:

set $C1=((C1*3)*(C2-2))/3$.

Accordingly, an expression that the database can evaluate is obtained. Finally, although the above discussion with respect to set operations covers single column functions, multiple column functions would require breaking a single set into multiple sets.

Embodiments of the present invention provide highly useful transformations to move data from and to various domains such that important comparisons and operations upon like data types can be performed. Specifically, SQL statements having where and order by clauses can advantageously employ column to property transform functions. Additionally, SQL set operations, such as update list commands can employ not only column to property transforms, but also property to column transforms.

Although the present invention has been described with reference to particular embodiments, workers skilled in the art will recognize that changes may be made in form and detail without departing from the spirit and scope of the invention.

What is claimed is:

1. A computer-implemented method of comparing object data in an object domain with database data in a database domain, the method comprising:
   providing the object data to a structured query language server;
   using the structured query language server to apply a first transfer function to the object data to generate first transformed data in an intermediate domain, wherein the first transformed data in the intermediate domain is of a different type than the object data and the first transfer function occurs on the structured query language server as part of an execution of a relational database query language statement;
   using the structured query language server to apply a second transfer function to the database data to generate second transformed data in the intermediate domain, wherein the second transformed data in the intermediate domain is of a different type than the database data and the second transfer function occurs on the structured query language server as part of an execution of a relational database query language statement, the intermediate domain comprising a domain that is intermediate to both the object domain and the database domain, and wherein at least one of the first and second transfer functions is a derived property transform;
   using the structured query language server to compare the first transformed data with the second transformed data in the intermediate domain; and
   providing an indication of the comparison of the first transformed data with the second transformed data.

2. The method of claim 1, wherein at least one of the first and second transfer functions is a data translating transform.

3. The method of claim 1, wherein the method is executed as part of a structured query language statement.

4. An object-relational database system, comprising:
a relational database having a database domain;
an object-oriented data accessing system for accessing the relational database, the object-oriented data accessing system having an object domain;
database data stored in the database domain;
object data stored in the object domain; and
a structured query language server that receives the object data from the object-oriented data accessing system and applies a first transfer function to the object data to generate first transformed data in an intermediate domain, the first transformed data in the intermediate domain having a different type than the object data, wherein the structured query language server receives the database data and applies a second transfer function to the database data to generate second transformed data in the intermediate domain, the second transformed data in the intermediate domain having a different type than the database data, wherein the first transfer function is different than the second transfer function and the intermediate domain comprising a domain that is intermediate to both the object domain and the database domain, and wherein the structured query language server compares the first transformed data to the second transformed data and provides an indication of the comparison, and wherein at least one of the first and second transfer functions is a derived property transform.

5. The object-relational database system of claim 4, wherein at least one of the first and second transfer functions is a data translating transform.

6. The object-relational database system of claim 4, wherein the relational database is configured to employ structured query language.

7. The object-relational database system of claim 4, wherein the relational database is configured to process one or more queries that are expressed in structured query language.

8. A computer-implemented method of operating upon object-relational data utilizing an intermediate domain that allows a set of operators and supports operations upon first data in a first domain, and second data in a second domain, the method comprising:
placing the first data from the first domain in the intermediate domain, wherein the first domain is an object domain and wherein placing the first data in the intermediate domain comprises applying a first transfer function to the first data in the object domain to change a data type of the first data;
placing the second data from the second domain in the intermediate domain, wherein the second domain is a relational database domain and wherein placing the second data in the intermediate domain comprises applying a second transfer function to the second data in the relational database domain to change a data type of the second data, wherein the second transfer function is different than the first transfer function and the intermediate domain comprises a domain that is different than the first and the second domains, and wherein at least one of the first and second transfer functions is a derived property transform; and
executing at least one operator upon the first and second data in the intermediate domain, wherein the operator is selected from the set of operators, and wherein all operators allowable upon data in the intermediate domain are permissible in the first domain such that they have the same effect in the first domain and intermediate domain.

9. The method of claim 8, wherein executing at least one operator includes executing a command on a relational database server.

10. The method of claim 8, wherein executing at least one operator includes executing a command on a structured query language server.

11. The method of claim 8, wherein executing at least one operator includes executing a query expressed in accordance with structured query language.

12. The method of claim 8, wherein at least one of the first and second transfer functions is executed on a structured query language server.

13. The method of claim 8, wherein a relational database includes the relational database domain and is configured to process one or more queries that are expressed in structured query language.

14. The method of claim 8, wherein at least one of the first and second transfer functions is a data translating transform.

15. The method of claim 8, wherein the method is executed as part of a structured query language statement.

16. The method of claim 15, wherein the method is executed as part of a "where clause" portion of the structured query language statement.

17. The method of claim 15, wherein the method is executed as part of a "set operation" portion of the structured query language statement.

18. The method of claim 15, wherein the method is executed as part of an "update set" portion of the structured query language statement.

19. The method of claim 15, wherein the method is executed as part of an "insert value" portion of the structured query language statement.

20. The method of claim 15, wherein the method is executed as part of an "order by" portion of the structured query language statement.

* * * * *